US012601268B2

(12) United States Patent
Gao et al.

(10) Patent No.: US 12,601,268 B2
(45) Date of Patent: Apr. 14, 2026

(54) CMC VANE WITH DETUNED PLATFORM

(71) Applicant: RTX CORPORATION, Farmington, CT (US)

(72) Inventors: Cheng Gao, South Glastonbury, CT (US); David J. Wasserman, Hamden, CT (US); Thomas S. Heylmun, Palm City, FL (US)

(73) Assignee: RTX CORPORATION, Farmington, CT (US)

( * ) Notice: Subject to any disclaimer, the term of this patent is extended or adjusted under 35 U.S.C. 154(b) by 46 days.

(21) Appl. No.: 18/456,159

(22) Filed: Aug. 25, 2023

(65) Prior Publication Data

US 2025/0067190 A1 Feb. 27, 2025

(51) Int. Cl.
*F01D 5/28* (2006.01)
*F02C 3/04* (2006.01)

(52) U.S. Cl.
CPC ............... *F01D 5/282* (2013.01); *F02C 3/04* (2013.01); *F05D 2300/6033* (2013.01)

(58) Field of Classification Search
CPC ...... F01D 11/005; F01D 11/008; F01D 9/041; F01D 5/282; F01D 5/284
See application file for complete search history.

(56) References Cited

U.S. PATENT DOCUMENTS

| | | | | |
|---|---|---|---|---|
| 4,025,229 A | * | 5/1977 | Browning | ............... F01D 9/044 |
| | | | | 415/209.2 |
| 4,639,189 A | * | 1/1987 | Rosman | .................. F01D 9/041 |
| | | | | 415/137 |

| | | | | |
|---|---|---|---|---|
| 8,961,135 B2 | | 2/2015 | Beeck et al. | |
| 8,967,961 B2 | | 3/2015 | McCaffrey | |
| 9,506,262 B2 | * | 11/2016 | Tavor | .................... E04H 4/1654 |
| 9,915,154 B2 | * | 3/2018 | Berczik | .................. F01D 5/284 |

(Continued)

FOREIGN PATENT DOCUMENTS

| | | |
|---|---|---|
| EP | 2570600 B1 | 2/2019 |
| FR | 2970999 A1 | 8/2012 |
| FR | 3127984 A1 | 4/2023 |

OTHER PUBLICATIONS

European Search Report for European Patent Application No. 24196294.3 mailed Mar. 3, 2025.

*Primary Examiner* — Courtney D Heinle
*Assistant Examiner* — Cameron A Corday
(74) *Attorney, Agent, or Firm* — Carlson, Gaskey & Olds, P.C.

(57) ABSTRACT

A method is disclosed for a design geometry of a ceramic matrix composite (CMC) vane arc segment that has a platform and an airfoil section that extends off of the platform. The platform defines an axially trailing face, an axially leading face that is circumferentially offset from the axially trailing face, and first and second circumferential faces. In the method, a modal excitation response of the platform is determined based upon an external engine operation excitation frequency. If the modal excitation response is greater than a target modal excitation response, the design geometry of the platform is adjusted to be detuned with the external engine operation excitation frequency by reducing an overhang distance of the platform in which the modal excitation response at the external engine operation excitation frequency is equal to or lower than the target modal excitation response.

8 Claims, 3 Drawing Sheets

(56)                     References Cited

U.S. PATENT DOCUMENTS

| | | | |
|---|---|---|---|
| 11,092,022 B2 * | 8/2021 | Sobanski ................ | F01D 5/282 |
| 11,492,917 B2 * | 11/2022 | Kittleson .................. | F01D 9/02 |
| 2003/0044282 A1 * | 3/2003 | Zhu ......................... | F01D 5/143 |
| | | | 416/193 A |
| 2013/0011265 A1 | 1/2013 | Miller et al. | |
| 2013/0052030 A1 * | 2/2013 | McCaffrey ............. | F01D 9/041 |
| | | | 416/241 B |
| 2014/0072432 A1 | 3/2014 | Woehler et al. | |
| 2016/0177766 A1 * | 6/2016 | Rioux .................. | F01D 11/005 |
| | | | 416/244 R |
| 2021/0095567 A1 | 4/2021 | Fukui et al. | |

* cited by examiner

CMC VANE WITH DETUNED PLATFORM

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A method according to an example of the present disclosure involves a design geometry of a ceramic matrix composite (CMC) vane arc segment that has a platform and an airfoil section that extends off of the platform. The platform defines an axially trailing face, an axially leading face that is circumferentially offset from the axially trailing face, and first and second circumferential faces that extend from the axially trailing face to the axially leading face. A modal excitation response of the platform is determined based upon an external engine operation excitation frequency. If the modal excitation response is greater than a target modal excitation response, the design geometry of the platform is adjusted to be detuned with the external engine operation excitation frequency by reducing an overhang distance of the platform. This produces a detuned platform in which the modal excitation response at the external engine operation excitation frequency is equal to or lower than the target modal excitation response.

In a further embodiment of any of the foregoing embodiments, the overhang distance is a length of the platform from the airfoil section to a corner of the platform.

In a further embodiment of any of the foregoing embodiments, the corner is an intersection of the trailing edge face and the second circumferential face.

In a further embodiment of any of the foregoing embodiments, the adjusting of the geometry of the platform includes incorporating chevrons into the first and second circumferential faces of the detuned platform such that the corner is eliminated.

In a further embodiment of any of the foregoing embodiments, the chevrons are aft of a trailing edge of the airfoil section.

In a further embodiment of any of the foregoing embodiments, in the detuned platform, first and second circumferential lengths of the detuned platform from the trailing edge of the airfoil section at the axially trailing face to, respectively, the first circumferential face and the second circumferential face are substantially equal.

A further embodiment of any of the foregoing embodiments includes fabricating a CMC vane arc segment in accordance with the CMC vane arc segment design geometry that has the detuned platform.

In a further embodiment of any of the foregoing embodiments, a natural frequency of the detuned platform provides a margin of 10% to 25% relative to the external engine operation excitation frequency.

A gas turbine engine article according to an example of the present disclosure includes a ceramic matrix composite (CMC) vane arc segment having a platform and an airfoil section extending off of the platform. The platform defines an axially trailing face, an axially leading face that is circumferentially offset from the axially trailing face, and first and second circumferential faces extending from the axially trailing face to the axially leading face. The first and second circumferential faces include chevrons such that a modal excitation response of the platform is detuned with respect to an external engine operation excitation frequency.

In a further embodiment of any of the foregoing embodiments, the chevrons are aft of a trailing edge of the airfoil section.

In a further embodiment of any of the foregoing embodiments, first and second circumferential lengths of the platform from the trailing edge of the airfoil section at the axially trailing face to, respectively, the first circumferential face and the second circumferential face are substantially equal.

A gas turbine engine according to an example of the present disclosure includes a compressor section, a combustor in fluid communication with the compressor section, and a turbine section in fluid communication with the combustor. The turbine section has ceramic matrix composite (CMC) vane arc segments each having a platform and an airfoil section extending off of the platform. The platform defines an axially trailing face, an axially leading face that is circumferentially offset from the axially trailing face, and first and second circumferential faces extending from the axially trailing face to the axially leading face. The platform is detuned with respect to a modal excitation response such that the first and second circumferential faces include chevrons.

In a further embodiment of any of the foregoing embodiments, the chevrons are aft of a trailing edge of the airfoil section.

In a further embodiment of any of the foregoing embodiments, first and second circumferential lengths of the platform from the trailing edge of the airfoil section at the axially trailing face to, respectively, the first circumferential face and the second circumferential face are substantially equal.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
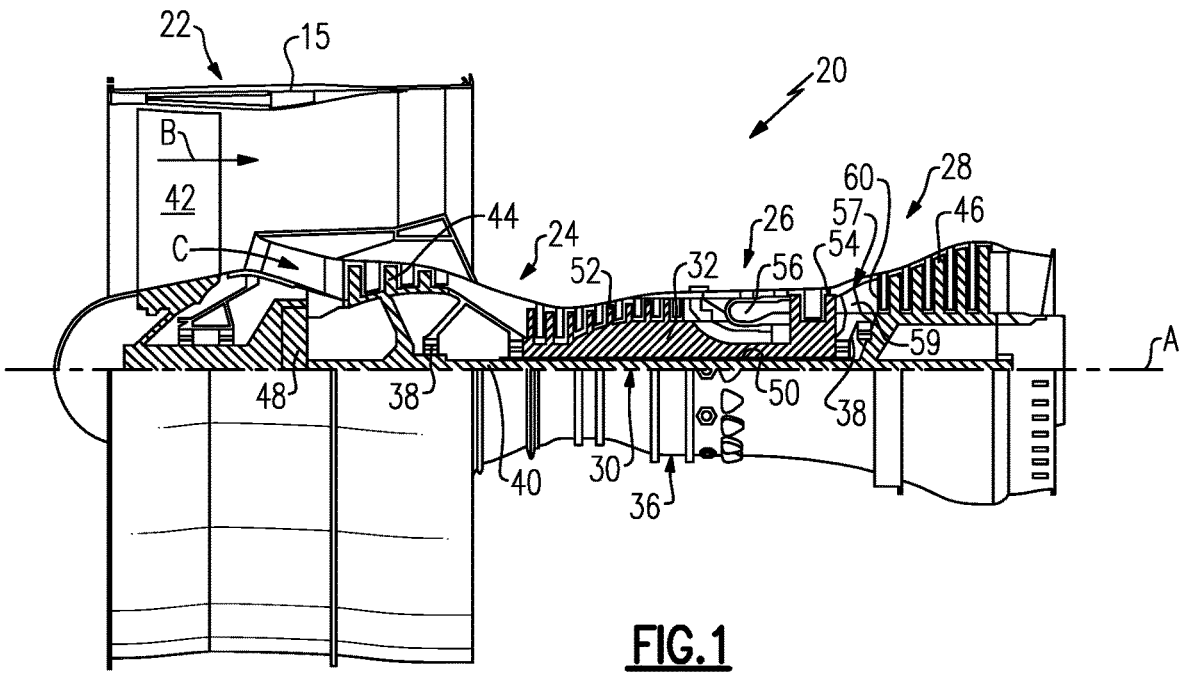
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition —typically cruise at about 0.8 Mach and about 35,000 feet (10,668 meters). The flight condition of 0.8 Mach and 35,000 ft (10,668 meters), with the engine at its best fuel consumption —also known as "bucket cruise Thrust Specific Fuel Consumption ('TSFC')"—is the industry standard parameter of 1 bm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/see divided by an industry standard temperature correction of $[(\text{Tram} \,^\circ \text{R})/(518.7^\circ \text{R})]^{05}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
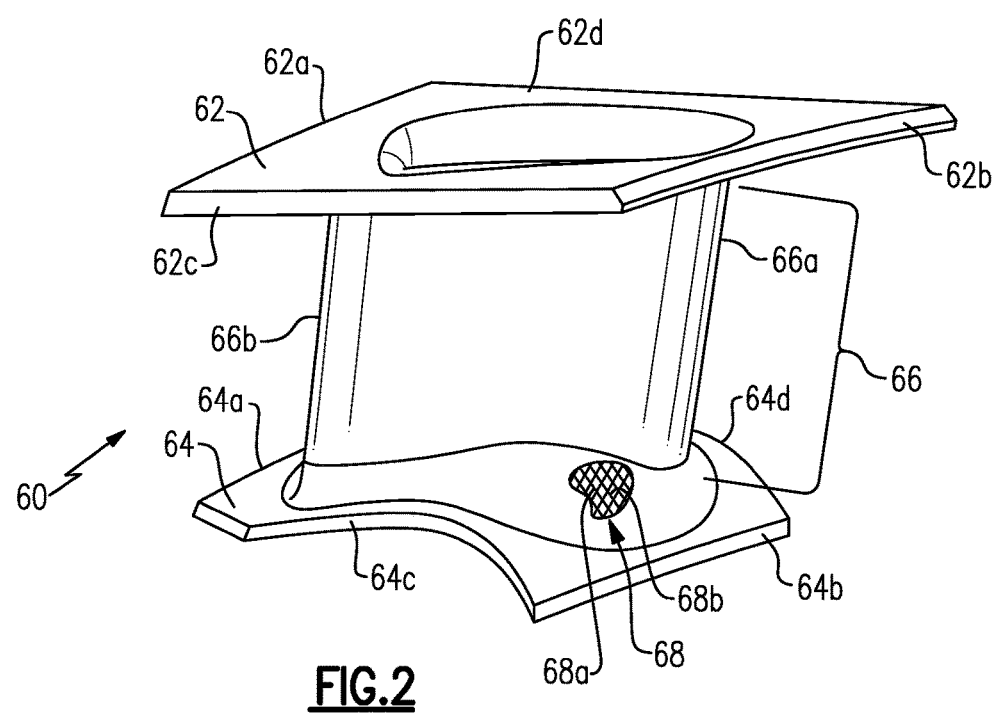
FIG. 2 illustrates a vane arc segment of the engine.
Figure 3:
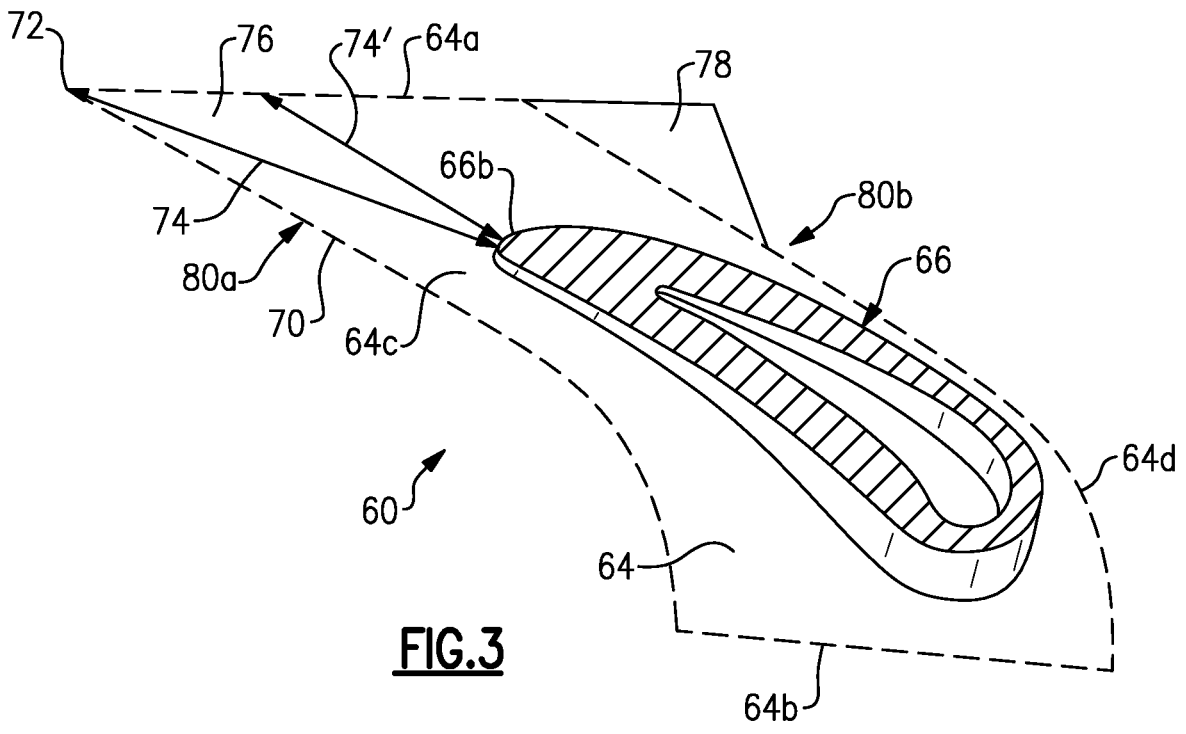
FIG. 3 illustrates a radial view of the design geometry of the vane arc segment.

FIG. 2 illustrates a representative gas turbine engine article in the form of a vane arc segment 60 from the turbine section 28 of the engine 20 (e.g., in a high or low pressure section). Multiple vane arc segments 60 are situated in a circumferential row about the engine central axis A. FIG. 3 illustrates a radial inward view of the vane 60 (sectioned through airfoil section 62).

Each vane arc segment 60 is comprised of several sections, including first and second platforms 62/64 and an airfoil section 66 that extends between the platforms 62/64. The airfoil section 66 in this example is hollow and defines a leading edge 66*a*, a trailing edge 66*b*, and pressure and suction sides (unnumbered). In this example, the first platform 62 is a radially outer platform and the second platform 64 is a radially inner platform. Terms such as "inner" and "outer" used herein refer to location with respect to the central engine axis A, i.e., radially inner or radially outer. Moreover, the terminology "first" and "second" used herein is to differentiate that there are two architecturally distinct components or features. It is to be further understood that the terms "first" and "second" are interchangeable in that a first component or feature could alternatively be termed as the second component or feature, and vice versa.

The platforms 62/64 have respective axially trailing faces 62*a*/64*a*, axially leading faces 62*b*/64*b* that are circumferentially offset from the axially trailing faces 62*a*/64*a*, first circumferential faces 62*c*/64*c*, and second circumferential faces 62*d*/64*d*. The circumferential faces 62*c*/64*c*/62*d*/64*d* extend, respectively, from the axially trailing face 62*a*/64*a* to the axially leading face 62*b*/64*b*. When assembled in the engine 20, the faces 62*c* interface or mate with the faces 62*d* of the next adjacent vane arc segment 60 in the row.

The vane arc segments 60 are formed of a ceramic matrix composite (CMC) 68. Referring to the cutaway section in FIG. 2, the CMC 68 includes ceramic fibers 68*a* that are disposed in a ceramic matrix 68*b*. The CMC 68 may be, but is not limited to, a SiC/SiC composite in which SiC fibers are disposed within a SiC matrix. The ceramic fibers 68*a* are provided in fiber plies that may be woven or braided and may collectively include plies of different fiber weave configurations. For example, the fiber plies are continuous through at least the first platform 62, the airfoil section 66, and the second platform 64.

Gas turbine engine articles are subject to vibrations during engine operation (e.g., at cruise conditions). For instance, a turbine vane may be subject to vibrations from turbine blades that rotate past the turbine vane at a given frequency. Such vibrations can cause modal excitation in the article that results in large displacement amplitudes that can reduce article durability. Articles formed of CMC can be particularly vulnerable to modal excitation. CMCs do not possess the same strength and ductility characteristics as superalloys, making CMCs more susceptible to distress, particularly at relatively weak locations in interlaminar interfaces between fiber plies where there are no fibers carrying the stress loads. In this regard, disclosed herein below and in the figures is a method for mitigating such modal excitations.

The method involves adjusting a design geometry of the vane arc segment 60 and, in particular, of the platform 64 (and/or 62). The "design geometry" is the 3D solid-form model of the vane arc segment 60, such as a computer-aided design (CAD) model. For example, the method includes determining a modal excitation response of the platform 64 based upon an external engine operation excitation frequency. In one example, this determination is conducted via modal analysis of the design geometry of the vane arc segment 60 based upon the external engine operation excitation frequency (or frequency range), which may be derived from measured or estimated stresses in engine tests or simulations. The modal excitation response is the vibratory response of the platform 64 (i.e., the frequency and amplitude) to the input external engine operation excitation frequency.

Next, the modal excitation response is compared to a target modal excitation response. For example, the target modal excitation response includes a threshold displacement amplitude. In one example, the threshold displacement amplitude corresponds to a threshold stress level of the CMC above which would be expected to cause an undesired level of distress. If the modal excitation response is greater than the target modal excitation response, the design geometry of the platform 64 is then adjusted. In one example, the modal excitation response is the maximum displacement amplitude of the platform 64 when subjected to the input external engine operation excitation frequency. Thus, if the maximum displacement amplitude is greater than a given threshold displacement amplitude, then the design geometry of the platform 64 will be adjusted in order to reduce the response to be within the threshold.

The adjustment to the design geometry of the platform 64 shifts the natural frequency of the platform 64 to be detuned (or at least farther out-of-tune) with the external engine operation excitation frequency. The phrase "detuned" refers to a natural frequency of the platform 64 that is substantially different than the external engine operation excitation frequency by a given margin percentage, such as 10%, 20%, or 25%. That is, if a natural frequency of a deflection mode shape is at or near the external engine operation excitation, there may be excitation in the platform 64 of that mode shape, but by shifting (i.e., detuning) the natural frequency of that mode to be farther from the external engine operation excitation, there is a lower likelihood of excitation of that mode.

Figure 4:
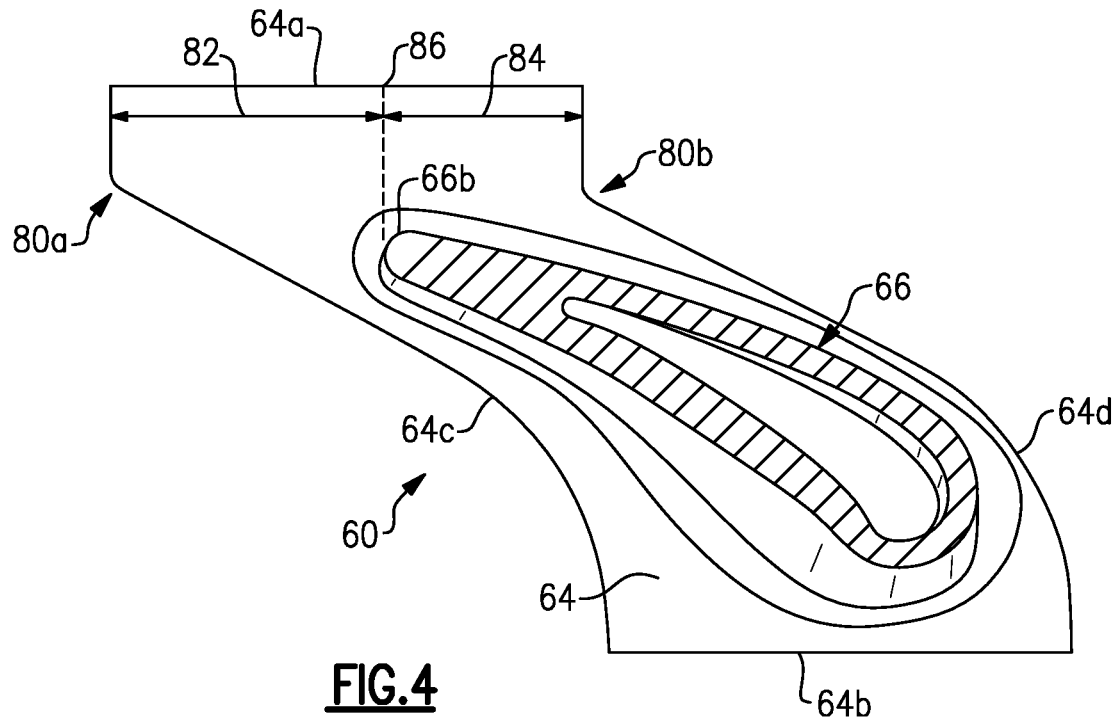
FIG. 4 illustrates an adjusted design geometry of the vane arc segment.

The adjustment of the design geometry involves altering the unsupported length 74 that the platform 64 "overhangs" the airfoil section 66, i.e., the distance from the base of the airfoil section 66 to the edges of the platform 64 at faces 64*a*/64*b*/64*c*/64*d*. For instance, an initial design geometry 70 of the platform 64 is encompassed in the dashed boundary line in FIG. 3. In this case, there is a maximum overhang distance 74 to the aft corner 72 between the intersection of faces 64*a* and 64*c* (the aft pressure-side corner) that has been determined to have a modal excitation response that is greater than the target modal excitation response. The design geometry is altered by reducing the overhang distance 74. To effectuate that reduction, chevrons are added to the faces 64*c*/64*d*, which eliminates the corner 72 and creates a new, shorter overhang distance 74'. For example, the corner region 76 at the face 64*c* (pressure side face) is eliminated and a new region 78 is added at the face 64*d* (suction side face) to form chevrons 80*a*/80*b* on the respective faces 64*c*/64*d*. The adjusted, or now detuned, platform 64 is shown in FIG. 4. The chevrons 80*a*/80*b* are complementary in that the chevron 80*a* nests into the chevron 80*a* of the next adjacent vane arc segment 60 in the vane row in the engine 20.

In the illustrated example, the chevrons 80*a*/80*b* are near the axially trailing face 64*a* of the platform, i.e., aft of the trailing edge 66*b* of the airfoil section. For instance, the corners of the chevrons 80*a*/80*b* are axially aft of the trailing edge 66*b*. The location, however, may varying in dependence upon, inter alia, required gap distance between the airfoil section and an adjacent row of turbine blades. In further examples, where the overhang distance 74 is at the axially leading face 64*b*, the chevrons 80*a*/80*b* are implemented near the leading face 64*b*, such as axially forward of the leading edge 66*a* of the airfoil section 66.

In the now detuned platform 64, the modal excitation response at the external engine operation excitation frequency is equal to or lower than the target modal excitation response. For instance, the reduction in the overhang distance 74 shifts the natural frequencies of the platform 64 such that the resultant deflection amplitude of the modal excitation response is equal to or lower than a given target deflection amplitude. This may also be represented as a frequency margin in which the shift in the natural frequency of a mode provides a margin percentage to the input external engine operation excitation frequency. In one example to demonstrate this, the external operation excitation frequency is 160 Hz, and the initial platform 64 has a natural frequency of 160 Hz that is then shifted to 190 Hz by adjustment of the design geometry to provide a margin percentage of about 18.75% to the external operation excitation frequency.

The design geometry of the detuned platform 64 (FIG. 4), in comparison to the initial platform 64 design geometry 70 (FIG. 3), has a more uniform mass balance. For instance, the mass distribution of the platform 64 may be represented by first and second circumferential lengths 82/84 from the circumferential position 86 of the trailing edge 66*b* of the airfoil section 66 at the axially trailing face 64*a* to, respectively, the first circumferential face 64*a* and the second circumferential face 64*b*. In the out-of-tune platform 64, the lengths 82/84 are substantially equal (e.g., within a range of 25%, 15%, or 5%). Unlike some past platform chevrons that served for space considerations to fit the footprint of an airfoil on the platform, the present chevrons 80*a*/80*b* serve to provide an adjustment of the modal excitation response of the platform 64.

Figure 5:
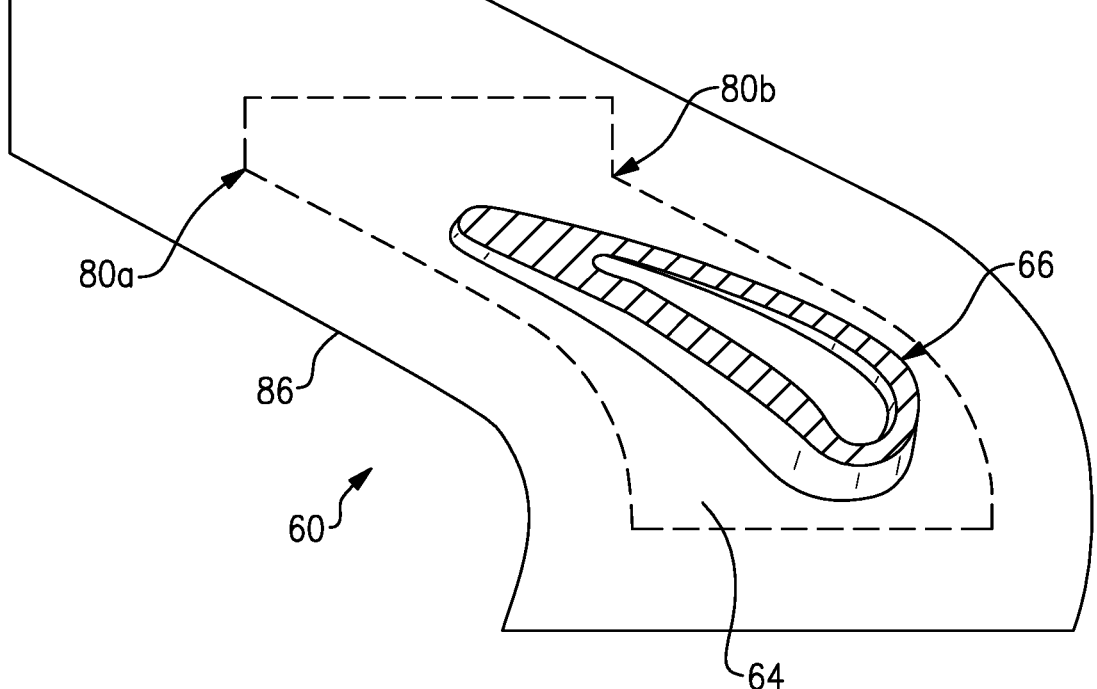
FIG. 5 illustrates an aspect of the fabrication of the vane arc segment.

FIG. 5 demonstrates an example of fabrication of the vane arc segment 60. The vane arc segment 60 is initially formed with an oversized platform 86. At a preform stage prior to consolidation with the matrix material, the oversized platform 86 is cut or machined to the desired geometry of the platform 64 to form the chevrons 80*a*/80*b*. To the extent that cutting or machining the platform 64 prior to densification causes ragged fiber edges that are of concern, the chevrons 80*a*/80*b* can alternatively be formed after consolidation with the matrix material, although cutting or machining the CMC at that stage may be more time consuming. The oversized platform 86 enables the chevrons 80*a*/80*b* to be applied to existing design geometries, whereby as long as the existing design geometry fits within the footprint of the oversized platform 86 it can be adjusted to include the chevrons 80*a*/80*b*.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
a ceramic matrix composite (CMC) vane arc segment having a platform and an airfoil section extending off of the platform, the platform defining an axially trailing face, an axially leading face that is circumferentially offset from the axially trailing face, and first and second circumferential faces extending from the axially trailing face to the axially leading face, the first and second circumferential faces including chevrons such that a modal excitation response of the platform under cruise conditions is detuned with respect to a natural frequency of the platform differing by a predetermined margin from an external engine operation excitation frequency of turbine blades that rotate past the CMC vane arc segment, wherein the chevrons are aft of a trailing edge of the airfoil section, and first and second circumferential lengths of the platform from the trailing edge of the airfoil section at the axially trailing face to, respectively, the first circumferential face and the second circumferential face are substantially equal.

2. A gas turbine engine comprising:
a compressor section;
a combustor in fluid communication with the compressor section; and
a turbine section in fluid communication with the combustor, the turbine section having ceramic matrix composite (CMC) vane arc segments each having a platform and an airfoil section extending off of the platform, the platform defining an axially trailing face, an axially leading face that is circumferentially offset from the axially trailing face, and first and second circumferential faces extending from the axially trailing face to the axially leading face, the first and second circumferential faces including chevrons such that a modal excitation response of the platform under cruise conditions is detuned with respect to a natural frequency of the platform differing by a predetermined margin from an external engine operation excitation frequency of turbine blades that rotate past the CMC vane arc segment, wherein the chevrons are aft of a trailing edge of the airfoil section, and first and second circumferential lengths of the platform from the trailing edge of the airfoil section at the axially trailing face to, respectively, the first circumferential face and the second circumferential face are substantially equal.

3. The gas turbine engine article as recited in claim 1, wherein the first circumferential face and the second circumferential face are substantially equal within a range of 25% or less.

4. The gas turbine engine article as recited in claim 1, wherein the first circumferential face and the second circumferential face are substantially equal within a range of 15% or less.

5. The gas turbine engine article as recited in claim 1, wherein the first circumferential face and the second circumferential face are substantially equal within a range of 5% or less.

6. The gas turbine engine article as recited in claim 1, wherein the predetermined margin is 25% or less.

7. The gas turbine engine article as recited in claim 1, wherein the predetermined margin is 20% or less.

8. The gas turbine engine article as recited in claim 1, wherein the predetermined margin is 10% or less.

* * * * *